United States Patent [19]
Leibold

[11] Patent Number: 5,898,860
[45] Date of Patent: Apr. 27, 1999

[54] SYSTEM AND METHOD FOR AUTOMATICALLY GENERATING A CONTROL DRAWING FOR A REAL-TIME PROCESS CONTROL SYSTEM

[76] Inventor: William Steven Leibold, Carefree, Ariz.

[21] Appl. No.: 08/724,638

[22] Filed: Oct. 1, 1996

[51] Int. Cl.⁶ .................................................. G06F 17/50
[52] U.S. Cl. .................... 395/500; 395/566; 364/468.02; 364/468.03; 364/528.1; 345/335
[58] Field of Search ..................... 395/500, 377, 395/376, 569, 595, 566; 364/578, 468.02, 468.03, 528.1; 345/347, 335

[56] References Cited

U.S. PATENT DOCUMENTS

| | | | |
|---|---|---|---|
| 4,663,704 | 5/1987 | Jones et al. | 364/188 |
| 4,736,320 | 4/1988 | Bristol | 364/300 |
| 5,023,800 | 6/1991 | Carver et al. | 364/474.24 |
| 5,287,439 | 2/1994 | Koga et al. | 395/133 |
| 5,333,298 | 7/1994 | Bland et al. | 395/500 |
| 5,371,895 | 12/1994 | Bristol | 395/800 |
| 5,386,503 | 1/1995 | Staggs et al. | 395/157 |
| 5,485,620 | 1/1996 | Sadre et al. | 395/700 |
| 5,552,995 | 9/1996 | Sebastian | 364/468.03 |
| 5,555,179 | 9/1996 | Koyama et al. | 364/468.01 |
| 5,644,493 | 7/1997 | Motai et al. | 364/468.02 |
| 5,706,453 | 1/1998 | Cheng et al. | 395/347 |

FOREIGN PATENT DOCUMENTS

| | | | |
|---|---|---|---|
| 0 588 108 A2 | 8/1993 | European Pat. Off. | G05B 19/417 |
| 0 718 727 A2 | 5/1996 | European Pat. Off. | G05B 19/042 |
| 04190425 | 8/1992 | Japan | G06F 9/44 |

OTHER PUBLICATIONS

Publication by OrCad entitled "Simulate for Windows" dated 1996.

Product Specification PSS 21S–7A1 B3 entitled I/A Series FoxCAE Engineering Package for Windows by Foxboro, a SIEBE Company, pp. 1–16; dated 1993–1994.

*Primary Examiner*—Kevin J. Teska
*Assistant Examiner*—Thai Phan

[57] ABSTRACT

A system for, and method of, generating a control drawing representing interconnections among elements of a real-time process control system and a plant controlled thereby. The system includes: (1) a memory that receives and stores textual input data representing explicit point connections among the elements, control language scripts containing implicit point connections among the elements and data regarding a starting element and (2) a processor, coupled to the memory, that analyzes the explicit and implicit point connections relative to the starting element and automatically constructs the control drawing as a function of the starting element, the system thereby generating the control drawing representing the interconnections.

24 Claims, 5 Drawing Sheets

SYSTEM AND METHOD FOR AUTOMATICALLY GENERATING A CONTROL DRAWING FOR A REAL-TIME PROCESS CONTROL SYSTEM

CROSS-REFERENCE TO RELATED APPLICATIONS

The present invention is related to those disclosed in U.S. Pat. No. 4,607,256 issued to Henzel on Aug. 19, 1986, entitled "Plant Management System;" U.S. Pat. No. 5,333, 298 issued to Bland, et al., on Jul. 26, 1994, entitled "System for Making Data Available to an Outside Software Package by Utilizing a Data File which Contains Source and Destination Information;" and U.S. Pat. No. 5,386,503 issued to Staggs, et al., on Jan. 31, 1995, entitled "Method for Controlling Window Displays in an Open Systems Environment". Each of the above-referenced patents is commonly assigned with the present invention and incorporated herein by reference.

TECHNICAL FIELD OF THE INVENTION

The present invention is directed, in general, to computing systems and, more specifically, to a system and method for automatically generating a control drawing for a real-time process control system that represents interconnectivity among elements of the process control system and the plant that the process control system is to control.

BACKGROUND OF THE INVENTION

Automated plant control systems (e.g., TDC 3000 Industrial Automation Systems manufactured by, and commercially available from, Honeywell Incorporated of Phoenix, Ariz.) include a comprehensive set of algorithms and auxiliaries to control and monitor various processes within, for instance, a manufacturing facility. The control systems can be tailored to satisfy a wide range of process requirements globally or within specified portions of the facility. Conventionally, the control systems include a plurality of modules, each having its own processor or firmware, linked together by a communication bus thereby resulting in a distributed process control system. The distributed nature of the system affords high performance with the capability to expand the system incrementally to satisfy growth or modifications in the facility.

A first objective of automated plant management is to provide a control scheme that synthesizes plant-wide control of all processes therein to improve an overall efficiency of the facility. A second objective is to couple the control scheme to the facility by providing a real time data acquisition and monitoring scheme that monitors the operation of the facility by collecting historical and real time data and responding to deviations from desired operation that may arise and displaying the data for the benefit of a user.

The process of designing these robust systems has been one of incremental evolution. At first, process control systems were designed and implemented for particular plants. As is easily imagined, such a system was very time and cost consuming. Later, companies, such as Honeywell, began developing configurable, or tailorable, process control systems. These systems were typically distributed, as set forth above, and included configurable logic that could be programmed to implement a particular plant's control strategy.

Engineers were typically tasked with the chore of analyzing a plant's design, or the actual plant, if it already existed. Analysis was often based on visual interpretation, typically using a "fill-in-the-form" type of approach to produce control drawings for the system and the plant. The control drawings typically included the various elements making up the plant and the process control system, including valves, vats, thermocouples, pressure gauges, pressure switches, etc., and delineated the point connections associating the elements.

Human errors inevitably occur, a valve is forgotten, the parameters of a vat are miscalculated, the threshold of a pressure gauge is transposed, etc. These errors, however, typically go unnoticed until implementation of the same, or, worse, the process control system goes on-line and is tested. The engineer is then tasked with back-checking the project to correct the plant's or the process control system's design, causing plant down-time, loss of revenues, waste of plant personnel resources or the like.

What is needed in the art therefore is a way of automatically generating control drawings from the point connections and control language scripts of a process control system.

SUMMARY OF THE INVENTION

To address the above-discussed deficiencies of the prior art, it is a primary object of the present invention to provide a way of automatically generating control drawings from the explicit point connections and control language scripts of a process control system.

In the attainment of the above primary object, the present invention provides a system for, and method of, generating a control drawing representing interconnections among elements of a real-time process control system and a plant controlled thereby. The system includes: (1) a memory that receives and stores textual input data representing explicit point connections among the elements, control language scripts containing implicit point connections among the elements and data regarding a starting element and (2) a processor, coupled to the memory, that analyzes the explicit and implicit point connections relative to the starting element and automatically constructs the control drawing as a function of the starting element, the system thereby generating the control drawing representing the interconnections.

The present invention therefore introduces the broad concept of deriving interconnection information not only from explicit point connections, but also from implicit point connections that are embedded within control language scripts. Once the interconnection information is derived, it is analyzed and employed to build a control drawing representing the process control system and the plant controlled thereby.

In a preferred embodiment of the present invention, the system further comprises an input data scan routine, operable on the processor, that automatically scans explicit point connections and control language scripts of an existing process control system and an existing plant, the system thereby able to construct a control drawing representing interconnections among elements of the existing real-time process control system and the existing plant.

In this embodiment, the present invention automatically extracts the interconnection information directly from an existing process control system and plant. This is somewhat analogous in operation to a decompiler; a control drawing can be automatically generated from a wholly undocumented process control system and plant by extracting select information therefrom.

In a preferred embodiment of the present invention, the system further comprises a keyboard, coupled to the memory, that allows the textual input data to be provided manually to the memory. Alternatively, the textual input data can be automatically extracted in part, and manually provided in part.

In a preferred embodiment of the present invention, the memory receives and stores breakpoint data. The breakpoint data, while not necessary to the present invention, allows a user to designate to what extent the processor is to analyze the process control system and plant.

In a preferred embodiment of the present invention, the memory receives and stores process level data. The process level data, while not necessary to the present invention, allows a user to designate a hierarchical level that limits to what extent the processor is to analyze the process control system and plant.

In a preferred embodiment of the present invention, the memory, processor and system are detached from the real time process control system to prevent use of resources thereof in connection with the generating of the control drawing. The memory, processor and system may alternatively form a part of the process control system itself.

In a preferred embodiment of the present invention, the system further comprises a logic point analysis routine, operable on the processor, to trace interconnections with respect to a specified element of a selected one of the process control system and the plant. The operation of the logic point analysis routine will be described in detail hereinafter.

In a preferred embodiment of the present invention, the system further comprises an auto line routing routine, operable on the processor, for automatically generating interconnecting lines among selected elements of the process control system and plant. Those skilled in the art are familiar with auto line routing routines and their operation. The present invention employs the auto line routing routine to provide symbolic interconnection between the elements.

In a preferred embodiment of the present invention, the system further comprises a display device, coupled to the processor, that displays a window containing a representation of at least a portion of the control drawing therein. As will be described in greater detail hereinafter, the present invention may advantageously be employed in conjunction with a graphical user interface ("GUI"), such as that provided under Microsoft® Windows,® Apple® System 7™ or other like windowed operating systems.

In a preferred embodiment of the present invention, the system further comprises an error generating routine, operable on the processor, that generates an error list while the processor analyzes the explicit and implicit point connections. The error list allows a user to locate and correct logical errors in the elements and interconnections.

An advantageous embodiment of the present invention is software-based. The software is executable by a processor and operable to direct the processor to automatically generate control drawings from the point connections among elements, and control language scripts, of a process control system. The software may be stored to any conventional storage medium, including magnetic, optic or electric-based devices, and suitable combinations of the same. Alternate embodiments may be implemented in hardware or firmware.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like objects, and in which.

DETAILED DESCRIPTION

As stated hereinabove, the present invention is directed to a system for, and method of, generating a control drawing representing interconnections among elements of a real time process control system and a plant controlled thereby. The system includes at least a memory and a processor. The memory receives and stores textual input data representing point connections among the elements, control language scripts containing implicit point connections among the elements and data regarding a starting element. The processor, which is associated with the memory, analyzes explicit and implicit point connections relative to the starting element and automatically constructs the control drawing as a function of the starting element, the system thereby generates the control drawing representing the interconnections.

As stated hereinabove, the present invention introduces the concept of deriving interconnection information not only from explicit point connections, but also from implicit point connections that are embedded within control language scripts. Once the interconnection information is derived, it is analyzed and employed to build a control drawing representing the real time process control system and the plant controlled thereby.

Each of the terms "include," "includes" or "including," as used herein, means inclusion without limitation; the phrase "associated with" and any derivative thereof, as used herein, may mean to include within, interconnect with, contain, be contained within, connect to or with, couple to or with, be communicable with, juxtapose, cooperate with, interleave, be a property of, be bound to or with, or the like; and the term "or," as used herein, is inclusive, meaning and/or.

Before undertaking a more detailed description of the above-described embodiment, it will be helpful to describe a real time process control system with which the present invention may suitably be associated in accordance with the principles of the present invention.

Figure 1:
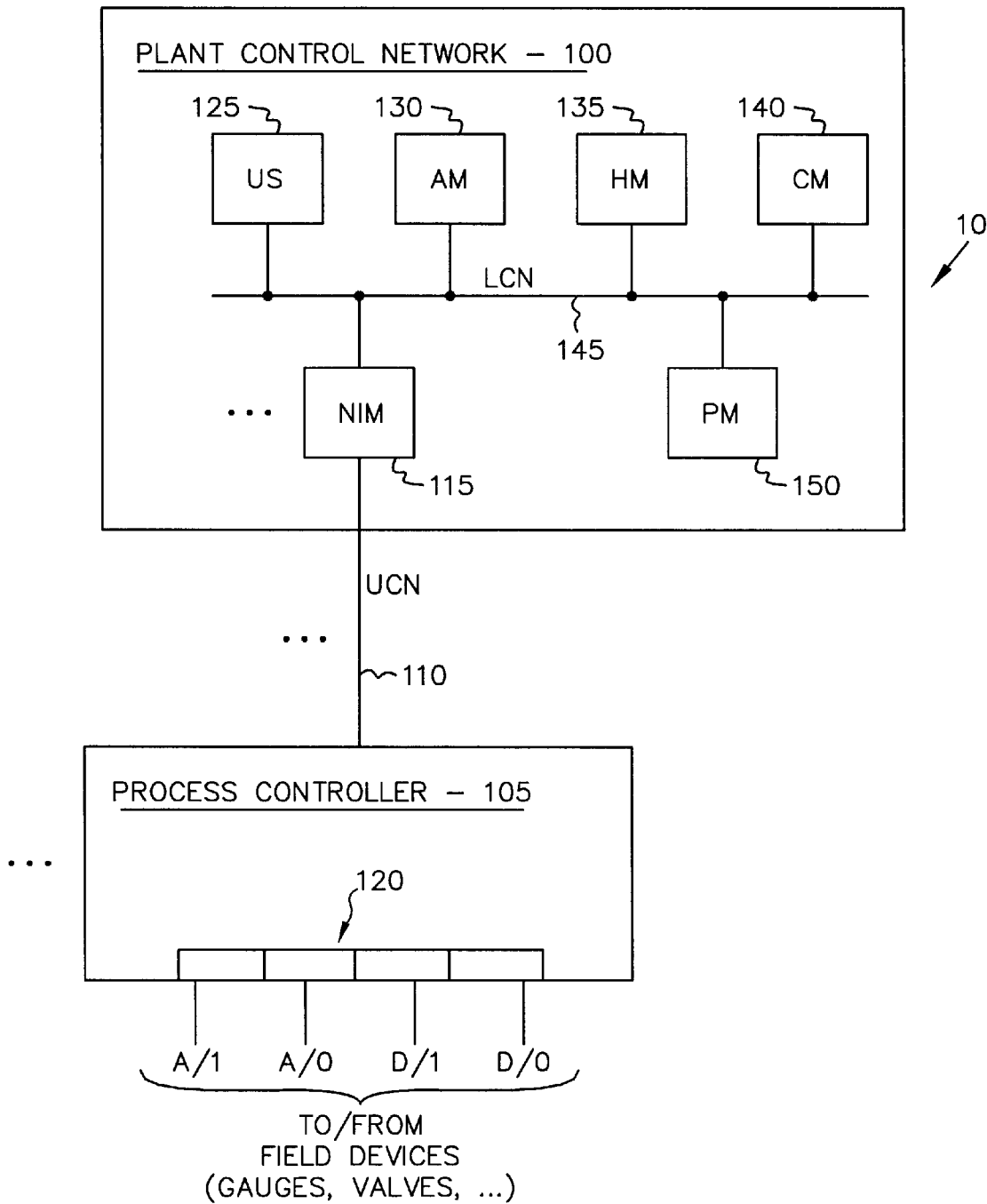
FIG. 1 illustrates a high-level block diagram of a process control system with which the present invention may suitably be associated.

Referring initially to FIG. 1, illustrated is a high-level block diagram of a real time process control system (generally designated 10), such as Honeywell's TDC 3000 Industrial Automation System, for example, with which the present invention may suitably be associated. Honeywell'S TDC 3000 Industrial Automation System is manufactured by, and commercially available from, Honeywell Inc., of Phoenix, Ariz. Exemplary process control system 10 illustratively includes a conventional plant control network 100 that is associated with a process controller 105 via a universal control network ("UCN") 110.

Exemplary plant control network 100 illustratively includes a network interface module ("NIM") 115, a universal operator station module ("UOS") 125, an application module ("AM") 130, a history module ("HM") 135, a computing module ("CM") 140, a Process Manager module ("PM") 150 and, possibly, duplicates of these modules (as well as additional module types, not shown, such as application dependent modules) as necessary to perform required supervisory functions of a process facility controlled by real time process control system 10. The above-identified modules are associated via a local control network ("LCN") 145.

Exemplary process controller 105 is associated with a plurality of communication interfaces 120 operative to transmit or receive data signals, such as analog, digital or other like signals, for example. According to the illustrated embodiment, the data signals may suitably be communicated electrically, although in alternate embodiments, the data signals may also be communicated optically, magnetically or the like.

Exemplary communication interfaces 120 are illustratively operative to transmit or receive analog input signals ("A/I"), analog output signals ("A/O"), digital input signals ("D/I") and digital output signals ("D/O"). These exemplary signals may suitably be communicated between plant control network 100 via process controller 105 and UCN 110 and a variety of conventional field devices (not shown), such as valves, pressure switches, pressure gauges, thermocouples or other like sensing/control devices.

According to the illustrated embodiment, process controller 105, in whole or in part, may be programmable to function as a logic point. An exemplary logic point includes a plurality of associated logic blocks. Each logic block may suitably be software-, firmware- or hardware-based, although, according to the illustrated embodiment, each of the logic blocks of Honeywell'S TDC 3000 comprises a plurality conventional discrete-type (e.g., "AND," "OR," "NAND," "NOR," "NOT," "EOR," etc.) and analog-type devices (e.g., "Lte," "Gte," "Gt," etc.). The plurality of logic blocks making up a single suitably arranged logic point that is used to implement a control strategy for process control system 10—the plurality of configurable logic blocks enable implementation of a logic block pattern to effectuate desired control behavior.

While the illustrated embodiment includes but a single plant control network 100 and process controller 105, it should also be noted that alternate embodiments of real time process control system 10 may suitably include a multitude of process controllers 105 associated with plant control network 100 via one or more UCNs 110, and vice versa.

Exemplary NIM 115 is operative to communicate data signals between UCN 110 and LCN 145 thereby proving an interface between the same.

Exemplary UOS 125 is a workstation for one or more plant operators, and may include an operator interface, such as a graphical user interface ("GUI"), for communication between one or more plant operators and the process or processes of the plant. All communication between UOS 125 and any other module of plant control network 100 is by means of LCN 145. UOS 125 has access to data that is on LCN 145 and the resources and data available through, or from, any of the other modules of plant control network 100 or process controller 105 via UCN 110.

Exemplary AM 130 is operative to provide additional data-processing capability in support of process control functions performed by process controller 105, such as data acquisition, alarm, batch history collection and providing continuous control computational facilities as needed. The data processing capability of AM 130 is provided by a conventional suitably arranged processor and associated memory (not shown).

Exemplary HM 135 is operative to provide large scale data storage. HM 135 may include at least one conventional suitably arranged disk mass-storage device, for example. The disk mass-storage device may provide large volume storage of data. The types of data stored by such mass storage devices are typically trend histories or data from which such trends may be determined, data that constitutes or forms displays, copies of programs, data bases, or the like.

Exemplary CM 140 is operative to use standard or common units of the exemplary physical modules to enable a medium-to-large scale, general-purpose data-processing system to communicate with other modules of plant control network 100 over LCN 145 and process controller 105 via NIM 115 and UCN 110. Conventional data processing systems of CM 140 provide supervisory, optimization, generalized user program preparation and execution of such programs, typically in high-level programming languages. These data processing systems may be capable of communicating with other like systems via conventional communication systems, or networks, and communication lines, as is well known in the art.

Exemplary CM 140 may include any conventional suitably arranged computer, or plurality of computers. One exemplary computer is the Honeywell DPS-6, which has been used in CM 140, and which is available from Honeywell, Inc. of Minneapolis, Minn., or the Hewlett-Packard ("HP") PA-RISC system, which is available from Hewlett-Packard of 3000 Hanover St., Palo Alto, Calif. 94304, to name two examples.

Exemplary PM 150 is operative to provide flexible and powerful process scanning and control capabilities using a processing architecture having multiple processors, each dedicated to performing a specific task. PM 150 includes an Advanced Process Manager Module ("APMM") and an I/O Subsystem (not shown).

The APMM consists of a communication processor and modem, I/O link interface processor, and control processor. The communication processor may be optimized to provide high performance network communications, handling such functions as network data access and peer-to-peer communications. The control processor may be dedicated to executing regulatory, logic, and sequence functions, including a user programming facility. Because communication and I/O processing are performed by separate dedicated hardware, the full power of the control processor can be applied to control strategy implementation. The I/O link interface processor is the interface to the I/O Subsystem.

The I/O Subsystem consists of a redundant I/O link and the I/O processors. These I/O processors handle field I/O for both data acquisition and control functions. The I/O processors, for example, may provide such functions as engineering unit conversion and alarm limit checking independent of the APMM. Control operations are performed within the APMM, with all data acquisition being performed in I/O processors. The process engineer has complete flexibility of choice, within the maximum APM design limits, in the assignment of point types and control strategies.

Exemplary LCN 145 may suitably employ a conventional high-speed communication bus to interconnect the exemplary modules (e.g., UOS 125, AM 130, etc.). Such a bus will provide a principle data transfer path between the data sources, such as NIM 115, AM 130, HM 135, etc., and the principal users of such data, such as UOS 125, AM 130 and CM 140. The bus also provides a suitable communication medium over which large blocks of data, such as memory images, may suitably be moved from one module, such as HM 135, to another, such as UOS 125.

A more complete description of an advantageous process control system 10 may be found in U.S. Pat. No. 4,607,256, commonly owned along with the present patent document and incorporated herein by reference for all purposes.

Figure 2A:
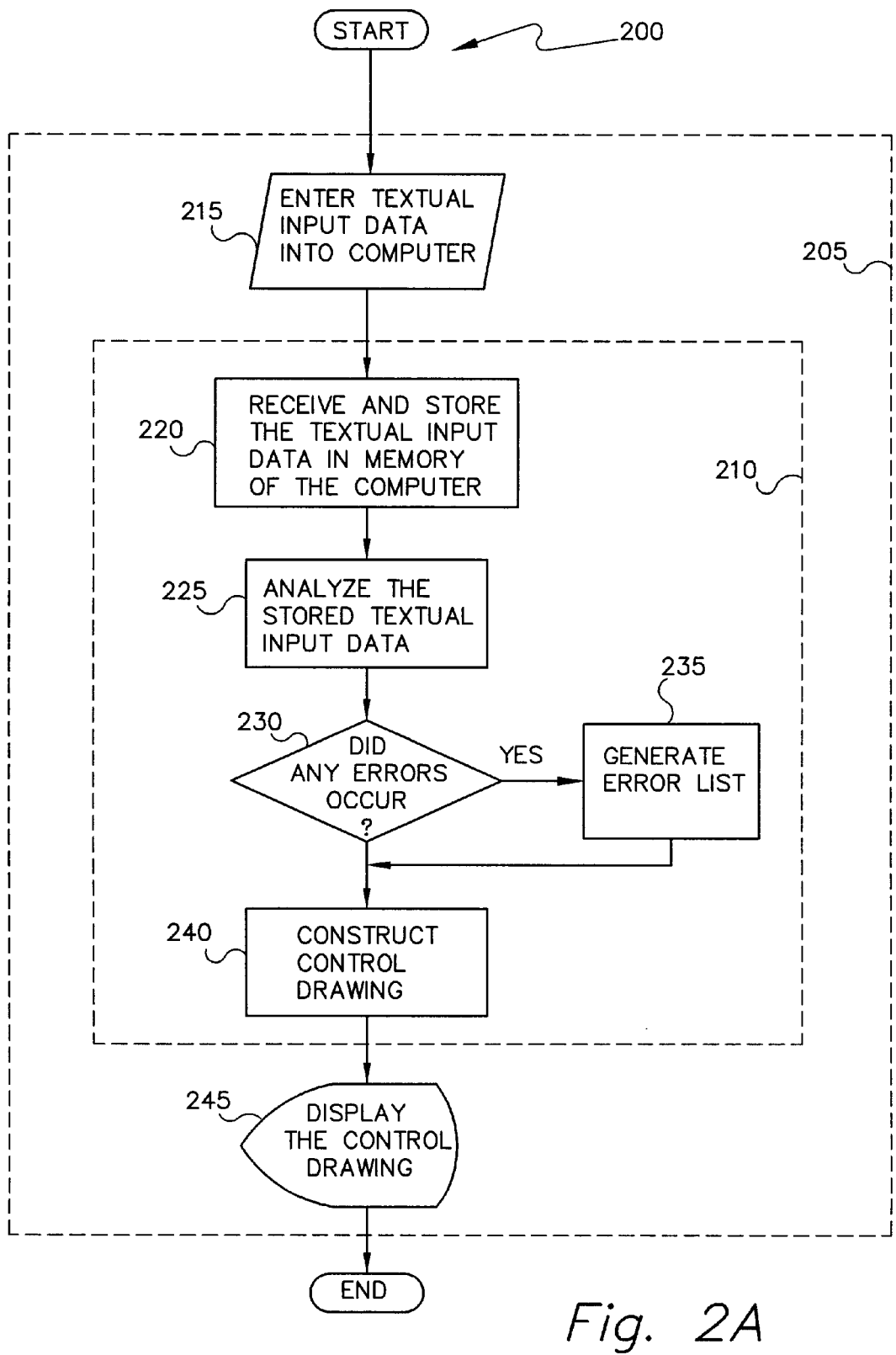
FIG. 2A illustrates a flow diagram of an exemplary method of operating a computer system to provide a way of automatically generating control drawings from point connections and control language scripts of a real time process control system in accordance with the principles of the present invention.

Turning now to FIG. 2A, illustrated is a flow diagram of an exemplary method (generally designated 200) of operating a computer system to provide a way of automatically generating control drawings from point connections and control language scripts of real time process control system 10 in accordance with the principles of the present invention. As stated hereinabove, a preferred embodiment of the present invention may be implemented in software, although alternate embodiments may suitably be implemented in firmware, hardware or combinations of the three. Exemplary method 200 may therefore suitably be implemented and operated within a conventional computer or processing system (generally designated 205) and, more particularly, in association with conventional processing circuitry (generally designated 210).

Broadly, exemplary method 200 is executable to generate an interconnectivity drawing that may suitably be based on control associations between configured points representing elements of process control system 10 or its associated plant. An advantage of this embodiment is that it may provide feedback to an off-line engineer, such as for back checking, providing a means of documenting control associations, or the like. Method 200 may be associated with a graphical interface depicting configured point objects and their control associations, and may operate to provide a plurality of options for generating control associations views.

To begin, a user uses a conventional input device, such as a keyboard, for example, to enter textual input data to computer 205 (input/output step 215). The textual input data represents at least (1) explicit point connections among elements of process control system 10, such as plant control network 100, process controller 105, valves, pressure switches, pressure gauges, thermocouples or other like sensing/control devices, as examples; (2) control language scripts containing implicit point connections among the elements; and (3) data regarding a starting element, such as plant control network 100, for example. The textual input data may also suitably include breakpoint, process level or other like data.

Breakpoint data allow the user to designate to what extent computer 205 is to analyze process control system 10 and its associated plant. Break points may therefore be used to enable the user to effectively select one or more entities in which to stop the control analysis from analyzing the connection for one or more selected breakpoints. Breakpoint tools may suitably be used for a control drawing that the user would like to break associated analysis down by selecting the break points. This is accomplished by the user selecting a point object as a breakpoint.

Process level data allow the user to designate a hierarchical level that limits to what extent computer 205 is to analyze process control system 10 and its associated plant. Process levels may be used to reduce the complexity of large coupled generation control drawings. A process level may be defined as a level in which a connection point object that contains connections is a parent level and the connections represent children or a next level of processing.

Figure 4:
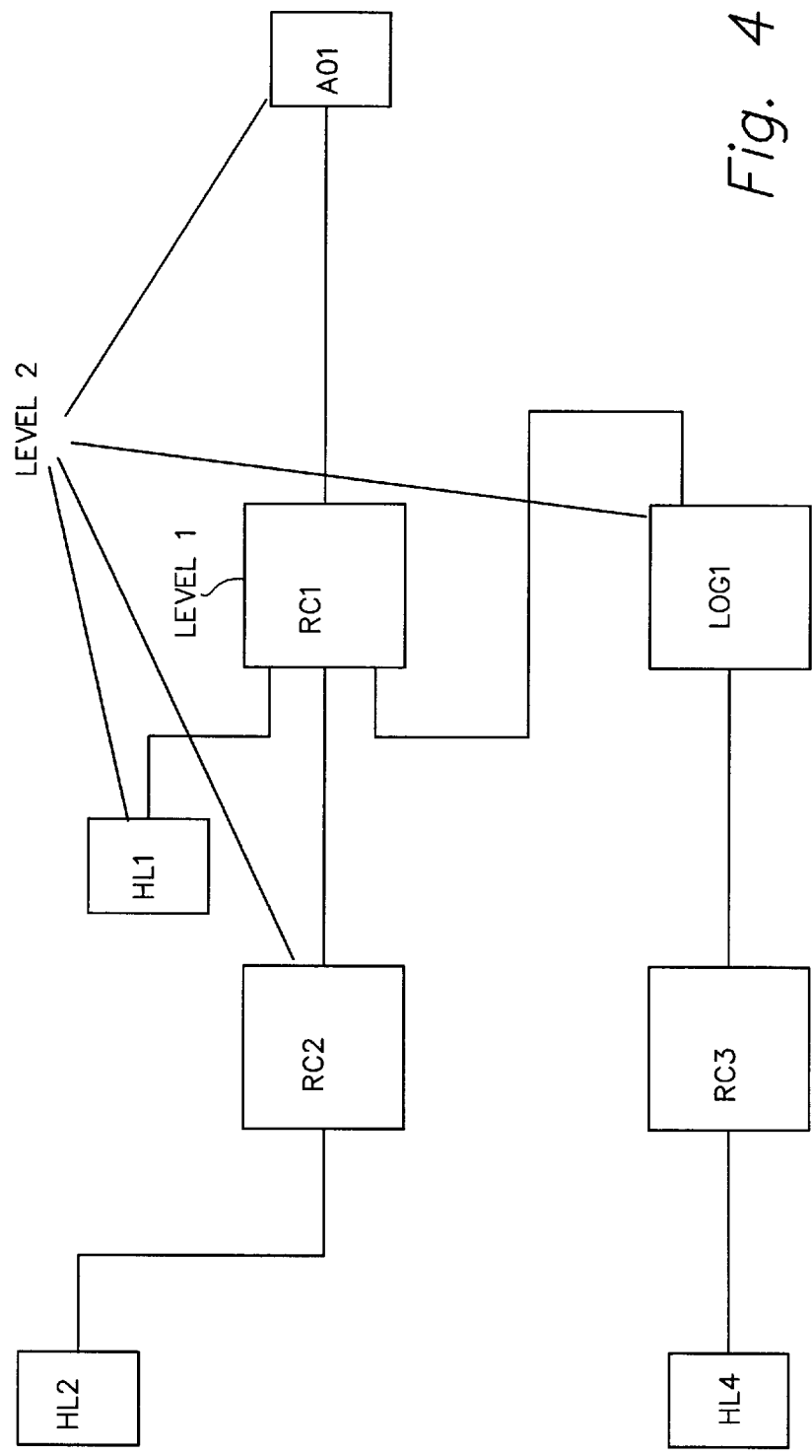
FIG. 4 illustrates a block diagram of an exemplary control drawing that may be generated in accordance with the principles of the present invention.

Turning momentarily to FIG. 4, illustrated is a block diagram of an exemplary control drawing that may be generated in accordance with the principles of the present invention. Assume that the user has designated block RC1 is a starting point for analysis, level 1 points only include RC1, level 2 points include HL1, RC2, LOG1, and AO1, level 3 points only include RC3 only and level 4 points only include HL3. Typically, three to five levels may suitably provide detail necessary to document a control strategy and assess any configuration change impacts to the control strategy based on the analyzed starting point.

Returning to FIG. 2A, it should also be noted that in alternate embodiments the textual input data may suitably be automatically entered through or from another computer or processing system (not shown), such as from real time process control system 10, for example (this embodiment is discussed with reference to FIG. 2B), or a combination of automatic and manual input.

A memory associated with computer 205 (and, by implication, processing circuitry 210) receives and stores the textual input data in memory (process step 220). Computer 205 analyzes the explicit and implicit point connections relative to the starting element (process step 225) and generates an error list if any errors are encountered while the processor analyzes the same (process step 235). The error list allows the user to locate and correct logical errors in the elements and interconnections.

According to the illustrated embodiment, point connections may be processed for possible control associations by searching through one or more project point tables for configured linked connections and by processing one or more control language scripts for control connections. Each connection point to be analyzed may be searched for in one or more point type tables—tables where connections are configured for matching. If a match occurs, then the connection point where the connection match exists may be placed at the end of an unprocessed stack for further processing. The connection point currently being processed may then be added to a processed stack as resolved with its internal connection information showing the link between itself and the connection point just placed on the unprocessed stack. When analysis of this connection point is complete, the unprocessed stack may then be processed as a first-in-first-out ("FIFO") stack where all the entities on the unprocessed stack are then processed in the same manner as just described.

In an advantageous embodiment, computer 205 may also include a logic point analysis routine. This routine is operative to trace interconnections with respect to a specified element of a selected one of process control system 10 or its existing plant. Recall that a logic point may suitably be associated with process controller 105 of FIG. 1.

Generally speaking, logic point analysis may be thought of as a process wherein a specific logic point connection is traced through its associated logic blocks to determine any and all point connections and external read/writes to its internal parameters for control drawing generation. Implementation of this routine may tend to generate a plurality of control associations if the element or group of elements under consideration utilizes many logic points, such as may occur for safety interlocking.

Computer 205 automatically constructs the control drawing as a function of the starting element (process step 240), the control drawing representing the interconnections. Computer 205 may suitably include an auto line routing routine that automatically generates interconnecting lines among elements of the representation of process control system 10 and its associated plant, such as UCN 110, for example. Those skilled in the art are familiar with auto line routing routines and their operation. The present invention may employ the auto line routing routine to provide symbolic interconnection between the elements.

According to the illustrated embodiment, computer 205 analyzes the various elements for a connection map that instantiates connection objects representing connection lines on the drawing. The connection objects are analyzed for required placement in a drawing grid consisting of point objects. This analysis may reveal the required number of connections and device spacing for subsequent moving of point objects to accommodate required connections. This may suitably be performed as a two step process, namely, (1) line objects are created, and analyzed for drawing placement, and (2) point objects are moved within a logical display window to accommodate line object placements. Point objects may be created for each unique process control system 10 point module type and point algorithm, each one may be unique and associated with particular behavior and characteristic indicia.

The following exemplary set of data base tables may be used during the generation of control drawings:

| Data Base Table 1 | |
|---|---|
| NIM.DBF | NIM Point Table |
| UAI.DBF | Analog Input Point Table |
| UDI.DBF | Digital Input Point Table |
| UDO.DBF | Digital Output Point Table |
| UDC.DBF | Digital Composite Point Table |
| UREGC.DBF | Regulatory Control Point Table |
| UREGPV.DBF | Regulatory PV Point Table |
| ULOGIC.DBF | Logic Point Table |
| ULGBLK.DBF | Logic Block Table |
| UDVCTL.DBF | Device Control Point Table |
| CLMAPDB.DBF | Extracted Command Language Point Relationships Table |

The above-identified data base tables may be used to generate the control drawing, extracting required information to establish the point interconnectivity and to extract point information necessary for instantiating point objects, more particularly, (1) NIM.DBF: This table is used to define the scope of available points to analyze for logic associations/ interconnectivity and to indicate point processed status, breakpoint status, and focal point status. A "NAME" field may be used to extract a point for analyzing its logic associations and a "PNTTYPE" field is used to define the point template for which the point is configured.

(2) UAI.DBF: This table is used to determine an analog input point type by reading a "PNTMODTY" field which will indicate type of analog input point being analyzed. This information may be used for the instatiation of an analog input point object which is uniquely based on a module type.

(3) UDI.DBF: This table is used to determine a digital input point type by reading a "PNTMODTY" field which may indicate the type of digital input point being analyzed. This information may be used for the instatiation of a digital input point object which may be uniquely based on a status type.

(4) UDO.DBF: This table is used for determining a digital output point type by reading a "PNTMODTY" field which may indicate the type of digital input point being analyzed. This information is used only for the instatiation of a digital output point object which may be uniquely based on a status type.

(5) UDC.DBF: This table is used to generate logic connections based on its configured input/output connections.

(6) UREGC.DBF: This table is used to generate logic connections based on its configured input/output connections.

(7) ULOGIC.DBF: This table is used to generate logic connections based on its configured input/output connections.

(8) ULGBLK.DBF: This table is used to analyze logic points' blocks for generating point associations based on its block configuration.

(9) UDVCTL.DBF This table is used to generate logic connections based on its configured input/output connections.

(10) CLMAPDB.DBF: This table is used to generate logic connections to point module command language sequence programs based on a point module command language sequence programs written logic. This table may contain all generated map file relationships for all of process control system 10's point module command language source files.

Computer 205 is associated with a conventional display device and is operative to direct the display device to display the control drawing (input/output step 245). The display device preferably provides an area for displaying data associated with a plurality of tasks, wherein the area is dividable into a plurality of windows that provide regions within the area for displaying data associated with corresponding ones of the tasks. In an advantageous embodiment, a window may suitably be provided that contains a representation of at least a portion of the control drawing therein.

It is apparent from the foregoing that the illustrated embodiment provides a method of operating computer 205 to generate the control drawing that represents the interconnections among the various elements of real-time process control system 10 and a plant controlled thereby. This embodiment illustrates the broad concept of the present invention for deriving interconnection information not only from explicit point connections, but also from implicit point connections that are embedded within control language scripts.

Figure 2B:
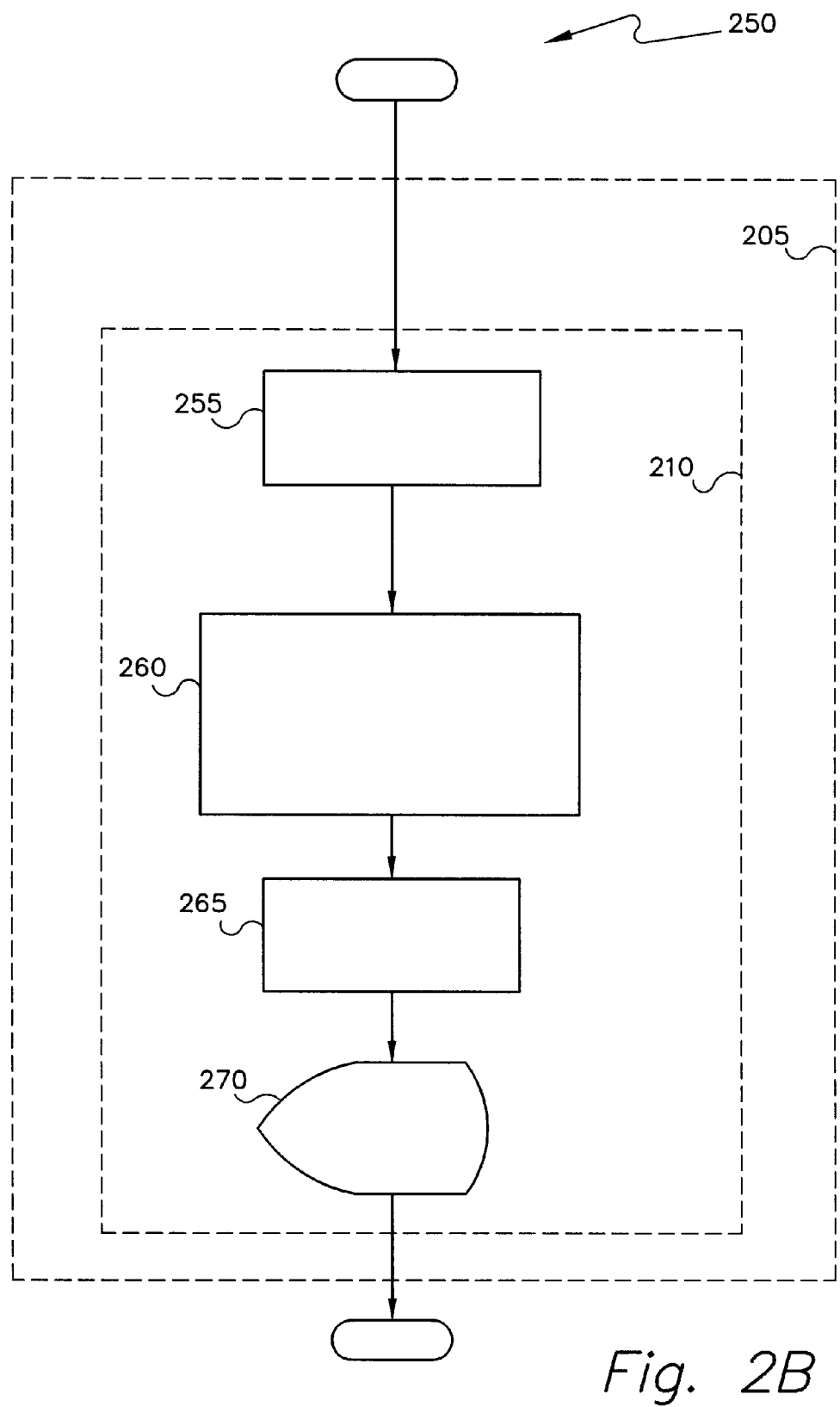
FIG. 2B illustrates a flow diagram of an alternate exemplary method of operating a computer system to provide a way of automatically generating control drawings of a real time process control system in accordance with the principles of the present invention.

Turning now to FIG. 2B, illustrated is a flow diagram of an alternate exemplary method (generally designated 250) of operating a computer system 205 to provide a way of automatically generating control drawings of a real time process control system 10 in accordance with the principles of the present invention.

To begin, a suitable communication link is established between computer 205 and real time process control system 10 (process step 255). Establishment of a suitable communication link between computers is well known. Computer 205, in accordance with the illustrated embodiment, includes an input data scan routine, and engages the same to automatically scan explicit point connections and control language scripts of existing real time process control system 10 and its existing plant (process step 260).

In an advantageous embodiment, computer 205 includes a logic point analysis routine, similar in function to that disclosed with reference to FIG. 2A, which may be associated with the input data scan routine. The logic point analysis routine is operative to trace interconnections with respect to a specified element of a selected one of process control system 10 or its existing plant. Recall that a logic point according to the illustrated embodiment may suitably be associated with process controller 105 of FIG. 1.

Computer 205 constructs a control drawing representing interconnections among the various elements of existing real time process control system 10 and the existing plant (process step 265). Computer 205 displays the control drawing to an associated conventional display device (input/output step 270).

The present embodiment automatically extracts interconnection information directly from existing process control system 10 and the existing plant. As stated hereinabove, this process is somewhat akin in operation to a decompiler; the control drawing may suitably be automatically generated from process control system 10 and its existing plant, which may be wholly undocumented, by extracting select information therefrom.

According to the illustrated embodiment, computer 205 is wholly detached from real time process control system 10 thereby preventing use of resources thereof in connection with generating of the control drawing. In an alternate embodiment, computer 205 may form a part of or be associated with process control system 10 itself, i.e., the above described method may run completely internally within process control system 10.

The foregoing discussions of FIGS. 2A and 2B described many features and advantages of the present invention. Those skilled in the art will realize that they may readily use the conception and the specific embodiments described as a basis for modifying or designing other structures for carrying out the same purposes of the present invention, and that such equivalent constructions do not depart from the spirit and scope of the invention in its broadest form.

Figure 3A:
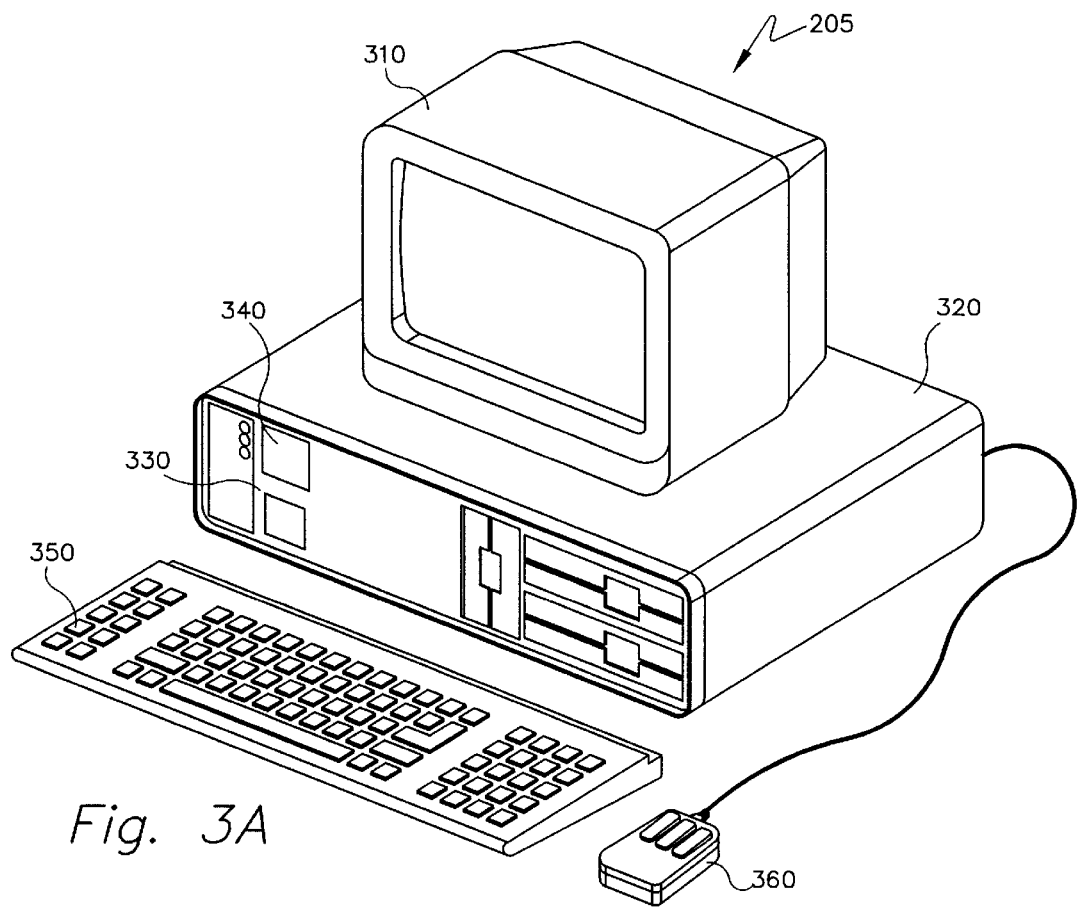
FIG. 3A illustrates an isometric view of a conventional computer that provides an environment within which the present invention may suitably be implemented and operated.

Turning now FIG. 3A, illustrated is an isometric view of a conventional computer 205, a personal computer ("PC"), that provides an environment within which the present invention may suitably be implemented and operated. Since the present invention is not limited to application in a personal computing environment, FIG. 3A is illustrative only.

Exemplary PC 205 includes a display device or monitor 310, a main chassis 320, within which are various electronic components (discussed with reference to FIG. 3B), and a plurality of exemplary conventional user interfaces, including a keyboard 350 and a mouse 360.

Display device 310, keyboard 350 and mouse 360 cooperate to allow communication between PC 205 and a user (not shown). Main chassis 320 illustratively includes a dedicated hardware reset switch 330 (adapted to trigger hardware reset circuitry (not shown) within main chassis 320 to reboot or restart PC 205 when the user depresses reset switch 330) and a power switch 340 (capable of interrupting and restoring power to PC 205). Interruption and restoration of power brings about a restart of PC 205.

Display device 310 provides an area for display of graphical data under the control of a conventional GUI operating system (not shown) executing within PC 205. GUI operating systems manage division of computer resources among various user-selected application tasks executing on PC 205, including division of the area of display device 310 into a plurality of suitably arranged windows that display data corresponding to each of the user-selected application tasks. Each window may suitably be allowed to occupy a portion or an entirety of the area presented on display device 310, depending on the user's wishes. Various ones of the windows may suitably occlude one another, whether in whole or in part.

While computers have been illustrated generally using PC 205, it should be noted that the principles of the present invention may be implemented and used with any suitably arranged computer system for simulating signal flow through a logic block pattern of a real time process control system, including laptop/notebook, mini, main frame and super computers, as well as networks of computers, such as local-area, metropolitan-area and wide-area networks, for example.

Figure 3B:
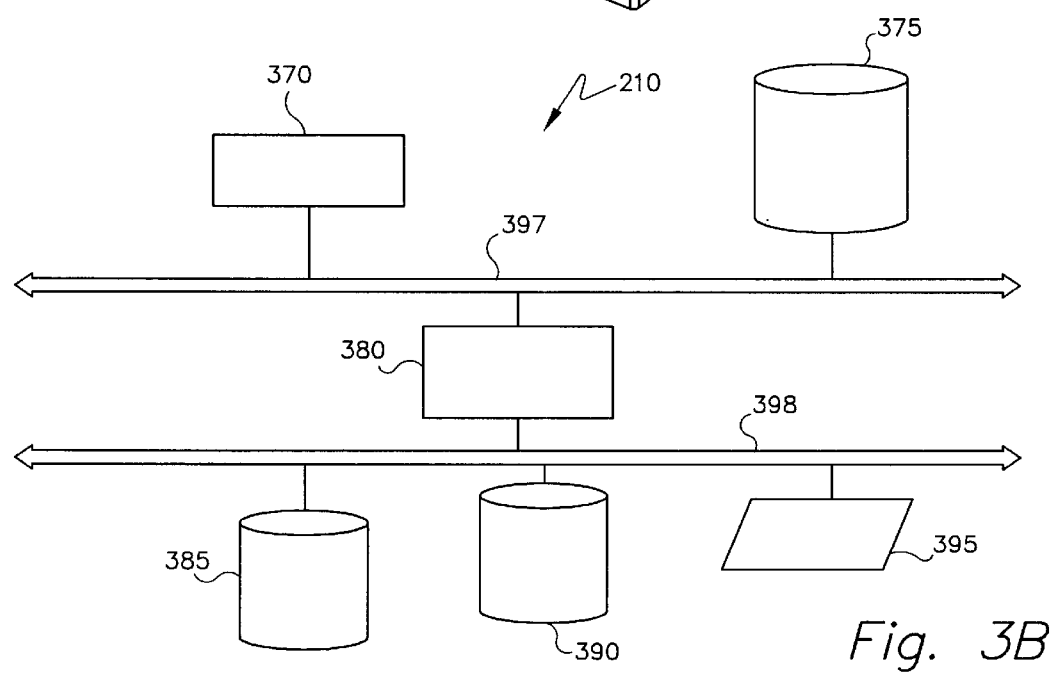
FIG. 3B illustrates a high-level block diagram of exemplary processing circuitry that may suitably be associated with the computer of FIG. 3A to provide an environment within which the present invention may suitably be implemented and operated.

Turning to FIG. 3B, illustrated is a high-level block diagram of exemplary processing circuitry (generally designated 210) that may suitably be associated with a computer, such as PC 205, to provide an environment within which the present invention may suitably be implemented and operated. Processing circuitry 210 illustratively includes a processor 370, a conventional random access memory ("RAM") 375, bus controller circuitry 380, a conventional read-only memory ("ROM") 385, a conventional video random access memory ("VRAM") 390 and a set of peripheral ports 395. An exemplary host bus 397 is shown and is suitably operative to associate processor 370, RAM 375 and bus controller circuitry 380. An exemplary input/output ("I/O") bus 398 is shown and is operative to associate bus controller circuitry 380, ROM 385, VRAM 390 and the set of peripheral ports 395. The set of peripheral ports 395 may suitably couple I/O bus 398 to any one or more of a plurality of conventional suitably arranged peripheral devices for communication therewith. Included among the set of peripheral ports 395 may suitably be one or more serial or parallel ports.

Bus controller circuitry 380 provides suitable means by which host bus 397 and I/O bus 398 may be associated, thereby providing a path and management for communication therebetween. Each of the illustrated buses 397 and 398 requires a drive current to carry signals thereon. The illustrative circuit accordingly operates in conjunction with a conventional system controller (not shown) that supplies the required drive current. Of course, the illustrative circuitry may also suitably be implemented having only a single bus or more than three buses.

According to the illustrated embodiment, exemplary RAM 375 may suitably be adapted, at least in part, for storing tasks for execution by processor 370. Processor 370 is operative upon execution of one or more the stored tasks to access exemplary VRAM 390 to display data on display device 310. As stated hereinabove, one or more of those tasks may suitably embody the principles of the present invention to generate a control drawing representing interconnection among elements of a real time process control system and a plant associated therewith.

In alternate advantageous embodiments, processing circuitry 210, in whole or in part, may be replaced by, or combined with, any suitable processing configuration, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs") , very large scale integrated circuits ("VLSIs") or the like, to form the various types of circuitry described and claimed herein.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference for all purposes.

From the above, it is apparent that the present invention provides a system for, and method of, generating a control drawing representing interconnections among elements of a real-time process control system and a plant controlled thereby. The system includes: (1) a memory that receives and stores textual input data representing explicit point connections among the elements, control language scripts containing implicit point connections among the elements and data regarding a starting element and (2) a processor, coupled to the memory, that analyzes the explicit and implicit point connections relative to the starting element and automatically constructs the control drawing as a function of the starting element, the system thereby generating the control drawing representing the interconnections.

Although the present invention and its advantages have been described in detail, those skilled in the art should understand that they can make various changes, substitutions and alterations herein without departing from the spirit and scope of the invention in its broadest form.

What is claimed is:

1. A system for generating a control drawing representing interconnections among elements of an existing plant controlled by a real-time process control system, said system comprising:

a memory that receives and stores textual input data representing explicit point connections among said elements, control language scripts containing implicit point connections that relate to said explicit point connections and data regarding a starting element;

a processor, coupled to said memory, that analyzes said explicit and implicit point connections relative to said starting element and automatically constructs said control drawing as a function of said starting element, said system thereby generating said control drawing representing said interconnections; and an input data scan routine, operable on said processor, that automatically scans said explicit point connections and said implicit point connections embedded within said control language scripts of an existing process control system for an existing plant and produces textual input data, said processor automatically constructing said control drawings representing real-time interconnections among said elements of said existing plant from said textual input data.

2. The system as recited in claim 1 further comprising a keyboard, coupled to said memory, that allows said textual input data to be provided manually to said memory.

3. The system as recited in claim 1 wherein said memory receives and stores breakpoint data.

4. The system as recited in claim 1 wherein said memory receives and stores process level data.

5. The system as recited in claim 1 wherein said memory, processor and system are detached from said real time process control system to prevent use of resources thereof in connection with said generating of said control drawing.

6. The system as recited in claim 1 further comprising a logic point analysis routine, operable on said processor, to trace interconnections with respect to a specified element of a selected one of said process control system and said plant.

7. The system as recited in claim 1 further comprising an auto line routing routine, operable on said processor, for automatically generating interconnecting lines among selected elements of said process control system and plant.

8. The system as recited in claim 1 further comprising a display device, coupled to said processor, that displays a window containing a representation of at least a portion of said control drawing therein.

9. The system as recited in claim 1 further comprising an error generating routine, operable on said processor, that generates an error list while said processor analyzes said explicit and implicit point connections.

10. A method of generating a control drawing representing real-time interconnections among elements of an existing plant controlled by a real-time process control system, said method comprising the steps of:

storing textual input data representing explicit point connections among said elements, control language scripts containing implicit point connections that relate to said explicit point connections and data regarding a starting element;

automatically scanning said explicit point connections and said implicit point connections embedded within said control language scripts of an existing process control system for an existing plant and producing textual input data;

analyzing said explicit and implicit point connections and said textual input data relative to said starting element; and automatically constructing said control drawing as a function of said starting element, thereby generating said control drawing representing said real-time interconnections among said elements of said existing plant.

11. The method as recited in claim 10 further comprising the step of allowing said textual input data to be provided manually to said memory.

12. The method as recited in claim 10 further comprising the step of storing breakpoint data.

13. The method as recited in claim 10 further comprising the step of storing process level data.

14. The method as recited in claim 10 wherein said method is performed independently of said real time process control system to prevent use of resources thereof in connection with said generating of said control drawing.

15. The method as recited in claim 10 further comprising the step of tracing interconnections with respect to a specified element of a selected one of said process control system and said plant.

16. The method as recited in claim 10 further comprising the step of automatically generating interconnecting lines among selected elements of said process control system and plant.

17. The method as recited in claim 10 further comprising the step of displaying a window containing a representation of at least a portion of said control drawing therein.

18. The method as recited in claim 10 further comprising the step of generating an error list while said processor analyzes said explicit and implicit point connections.

19. A system for automatically generating a control drawing representing real-time interconnections among elements of an existing plant controlled by an existing real-time process control system, said system comprising:

- an input data scan routine, operable on a processor of said system, that automatically scans explicit point connections and implicit point connections embedded within control language scripts of said existing plant to produce therefrom textual input data;
- a memory, coupled to said processor, that receives and stores said textual input data, data regarding a starting element, breakpoint data and process level data; and
- an analysis routine, operable on said processor, that analyzes said explicit and implicit point connections and textual input data relative to said starting element and automatically constructs said control drawing as a function of said starting element, said breakpoint data and said process level data, said system thereby able to construct a control drawing representing real-time interconnections among elements of said existing plant.

20. The system as recited in claim 19 wherein said memory, processor and system are detached from said existing real time process control system to prevent use of resources thereof in connection with said generating of said control drawing.

21. The system as recited in claim 19 further comprising a logic point analysis routine, operable on said processor, to trace interconnections with respect to a specified element of a selected one of said existing process control system and said existing plant.

22. The system as recited in claim 19 further comprising an auto line routing routine, operable on said processor, for automatically generating interconnecting lines among selected elements of said existing process control system and existing plant.

23. The system as recited in claim 19 further comprising a display device, coupled to said processor, that displays a window containing a representation of at least a portion of said control drawing therein.

24. The system as recited in claim 19 further comprising an error generating routine, operable on said processor, that generates an error list while said processor analyzes said explicit and implicit point connections.

* * * * *